(12) United States Patent
Obrador

(10) Patent No.: US 6,585,521 B1
(45) Date of Patent: Jul. 1, 2003

(54) VIDEO INDEXING BASED ON VIEWERS' BEHAVIOR AND EMOTION FEEDBACK

(75) Inventor: Pere Obrador, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/023,810

(22) Filed: Dec. 21, 2001

(51) Int. Cl.[7] .......................... G09B 19/00; G09G 5/00

(52) U.S. Cl. .................. 434/236; 345/721; 369/27.01; 725/10; 725/12

(58) Field of Search ................................ 434/236, 237, 434/238; 345/721; 369/24.01, 27.01, 98; 725/10, 12

(56) References Cited

U.S. PATENT DOCUMENTS

| | | | |
|---|---|---|---|
| 5,243,517 A | 9/1993 | Schmidt et al. | 364/419.2 |
| 5,676,138 A | 10/1997 | Zawilinski | 128/630 |
| 5,774,591 A * | 6/1998 | Black et al. | 382/236 |
| 5,828,809 A * | 10/1998 | Chang et al. | 386/69 |
| 5,944,530 A * | 8/1999 | Ho et al. | 434/236 |
| 6,099,319 A | 8/2000 | Zaltman et al. | 434/236 |
| 6,260,022 B1 | 7/2001 | Brown | 705/2 |
| 6,293,904 B1 | 9/2001 | Blazey et al. | 600/26 |

FOREIGN PATENT DOCUMENTS

JP 2001268657 A * 9/2001 ............ H04Q/9/00

OTHER PUBLICATIONS

Wei, Jie, Ze–Nian Li, Gertner, I., "A Novel Motion–based Active Video Indexing Method", IEEE International Conference on Multimedia Computing and Systems, vol. 2, Jul. 1999, pp. 460–465.*

Koppel, Ted, "Virage and Visionics Team Up to Add Face Recognition Capabilities to Virage's Award–winning Video Indexing Software", Business Wire, Feb. 9, 2000.*

Smoliar, Stephen, W., et al., "Content–Based Video Indexing and Retrieval", Summer 1994, p.p. 62–72, IEEE Multimedia, National University of Singapore.

Arman, F., et al., "Content–Based Browsing of Video Sequences", Siemens Corporate Research, Inc., Oct. 1994, p.p. 97–103.

"Emotion Recognition in Human–Computer Interaction", IEEE Signal Processing Magazine, Jan. 2001, p.p. 33–80.

* cited by examiner

Primary Examiner—John Edmund Rovnak (57) ABSTRACT

A method and a corresponding apparatus for video indexing based on viewers' behavior and emotion feedback to automatically index a multimedia sequence using viewers' casual feedback while watching the multimedia sequence. The method and apparatus use a system, such as an emotion detection system that includes one or more multimedia acquisition devices, such as video cameras, to detect viewers' behavior and emotion feedback, and to produce as video indices various categories of behavior and emotion segments. Each video camera may include one or more image sensors and/or audio sensors. The viewers or other users, i.e., user, may later selectively view the multimedia sequence by browsing through the video indices of various categories of emotion. The video indices are similar to chapters within digital video disc (DVD) movies that enable a user to jump directly to a particular chapter without having to fast forward.

20 Claims, 8 Drawing Sheets

VIDEO INDEXING BASED ON VIEWERS' BEHAVIOR AND EMOTION FEEDBACK

TECHNICAL FIELD

The technical field relates to video imaging system, and, in particular, to video indexing system.

BACKGROUND

Users are increasingly using video cameras to record home videos, television programs, movies, concerts, or sports events on a disk or DVD for later or repeated viewing. A video camera typically records both video and audio to generate a video sequence, which can be stored in a secondary storage, such as a hard disk or a CD-ROM. Such video sequences typically have varied content or great length. Since a user normally cannot write down what is on a video sequence or where on a video sequence particular scenes, movies, events are recorded, the user may have to sit and view an entire video sequence to remember what was recorded or to retrieve a particular scene. Video indexing allows a user to have easy access to different sections of the video sequence so that the user do not need to fast forward through the whole video sequence.

Current video indexing devices use video content analysis that automatically or semi-automatically extracts structure and meaning from visual cues in a video. After, for example, a video clip is taken from a television (TV) program or a home video, a computer will generate particular indexes so that a user can jump to a particular section within the video sequence.

However, automatic video indexing typically generates different key frames, with the need for extensive post-processing, which involves automatic search for shot changes, scene changes, and ultimately, frames that may serve as key-frames. In addition, automatic video indexing may or may not help a user find a particular video event within a recording.

SUMMARY

A method for video indexing based on viewers' behavior and emotion feedback includes monitoring one or more viewers during a multimedia sequence play back and detecting the one or more viewers' behavior and emotion feedback. The method further includes categorizing the one or more viewers' behavior and emotion feedback as a plurality of categories of behavior and emotion segments, and indexing the multimedia sequence using the plurality of categories of behavior and emotion segments. As a result, the viewers or other users can selectively view the multimedia sequence using the plurality of categories of behavior and emotion segments as video indices.

The method for video indexing based on viewers' behavior and emotion feedback is transparent to the user, and may generate custom indexing to a particular user, affording a user-friendly hierarchy for video browsing.

DESCRIPTION OF THE DRAWINGS

The preferred embodiments of the method for video indexing based on viewers' behavior and emotion feedback will be described in detail with reference to the following figures, in which like numerals refer to like elements, and wherein.

DETAILED DESCRIPTION

A method and a corresponding apparatus for video indexing based on viewers' behavior and emotion feedback to automatically index a multimedia sequence, such as a video sequence, using viewers' casual feedback while watching the multimedia sequence. The method and apparatus use a system, such as an emotion detection system that includes one or more multimedia acquisition devices, such as video cameras, to detect viewers' behavior and emotion feedback, and to produce as video indices various categories of behavior and emotion segments. In other words, human reactions are detected and indexed into video bitstream. Each video camera may include various sensors. The viewers or other users, i.e., user, may later selectively view the multimedia sequence by browsing through the video indices of various categories of emotion. The video indices are similar to chapters within digital video disc (DVD) movies that enable a user to jump directly to a particular chapter without having to fast forward. The method and apparatus for video indexing is transparent to the user, and may generate custom indexing to a particular user, affording a user-friendly hierarchy for video browsing.

The emotion detection system is known in the art, which may be able to detect any type of emotion, some reliable and some not so reliable. Many different categories may be generated to represent different emotions, such as "amused", "angry", "astonished", "curious", "patient", "happy", "proud", "scared", and "worried".

The emotion detection is described, for example, in U.S. Pat. No. 5,676,138, entitled "Emotional Response Analyzer System with Multimedia Display," issued on Oct. 14, 1997 to Zawilinski, U.S. Pat. No. 6,099,319, entitled "Neuroimaging as a Marketing Tool," issued on Aug. 8, 2000 to Zaltman et al., and "Emotion Recognition in Human-Computer interaction" by Cowie et al, January 2001 on IEEE Signal Processing Magazine, which are incorporated herein by reference. Zawilinski discloses a multimedia computerized system for detecting emotional responses of human beings and the changes therein over time. Zaltman et al. disclose neuroimaging as a means for validating whether a stimulus such as advertisement, communication, or product evokes a certain mental response such as emotion, preference, or memory, or to predict the consequences of the stimulus on later behavior such as consumption or purchasing. Cowie et al. disclose a hybrid psychological and linguistic emotion analysis system capable of using information from faces and voices to recognize people's emotions.

Video indexing is described, for example, in "Content-Based Browsing of Video Sequences" by Arman et al., ACM multimedia, pages 97–103, 1994; and "Content Based Video Indexing and Retrieval" by Smoliar et al., IEEE multimedia, pages 62–72, 1994, which are incorporated herein by reference. Arman et al. disclose a novel methodology to represent the contents of a video sequence. The methodology uses a content-based browsing system that forms an abstraction to represent each shot of the sequence by using a representative frame, and allows a user to easily navigate the frame, i.e., rapidly view a video sequence in order to find a particular point within the sequence. Smoliar et al. disclose a method for content-based video indexing and retrieval. The method includes parsing the video stream into generic clips, indexing the video clips when inserted into a database, and retrieval and browsing the database through queries based on text and/or visual examples.

The method and apparatus for video indexing based on viewers' behavior and emotion feedback can be used in combination with other types of video indexing, such as traditional scene change or shot change indexing, or manual indexing using high resolution still images. Video indexing using high resolution still images is described, for example, in U.S. Patent Application, entitled "Video Indexing Using High Resolution Still Images," filed on the same day herewith, which is incorporated herein by reference. Different types of video indexing may be used in the same video sequence. The user can add manual indexing, for example, within two minutes of a "happy" scene, using a still image of a person falling down, causing laughter among people.

The emotion detection system 100 may detect and categorize different viewers' behavior and emotion feedback every time the same video sequence is watched, and gradually generate more information regarding the video sequence. Therefore, the emotion detection system 100 can iteratively generate more accurate indices based on different viewers' feedback. For example, if every time a video sequence is played back, different viewers laugh while watching a certain segment of the video sequence, the emotion detection system 100 may accurately categorize that segment as "funny", and index the segment accordingly.

Figure 1A:
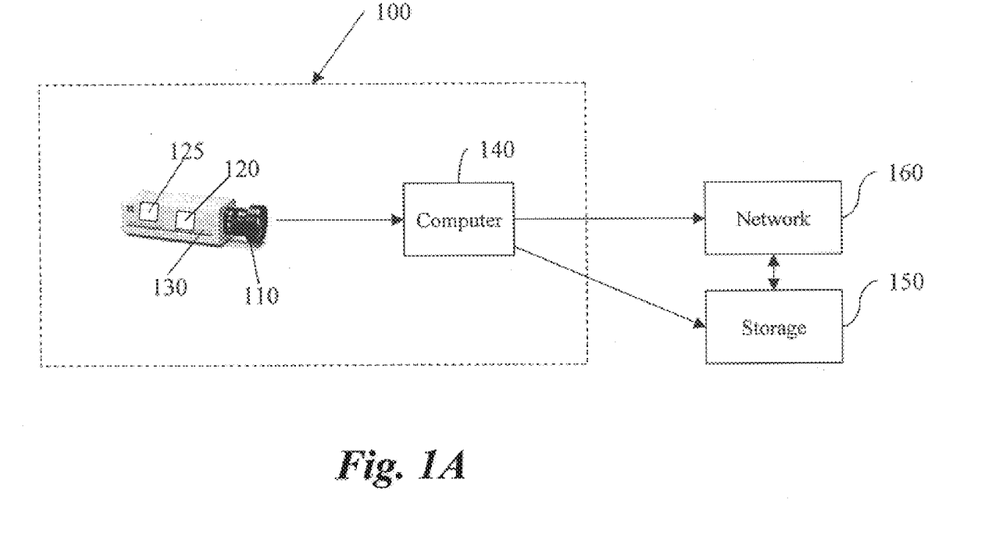
FIG. 1A illustrates an exemplary emotion detection system that can be connected with a network and a remote storage.

FIG. 1A illustrates an exemplary emotion detection system 100 that can be connected with a network 160 and a remote storage 150. The exemplary emotion detection system 100 includes one or more multimedia acquisition devices, such as video cameras 130, and a computer 140. The video cameras 130 point to and monitor one or more viewers during a multimedia sequence, such as a video sequence, play back. Each video camera 130 includes an image sensor 110 for capturing facial expression and physical movement of the viewers. Each video camera 130 may also include an audio sensor 120, such as a microphone, for capturing audio signal in the viewers' voice. In addition to image sensors 110 and audio sensors 120, other types of sensor 125, such as electric or temperature sensors, may be used by the emotion detection system 100 for video indexing. For example, electrodes may be placed on human head to acquire electrical responses. The emotion detection system 100 may include different combinational use of the sensors.

The emotion detection system 100 then uses the computer 140 to categorize different behavior and emotion segments of a scene, and automatically index the video sequence according to various categories of behavior and emotion segments. The indexed video sequence may be transmitted to the network 160 and/or the remote storage 150 to be stored. The remote storage 150 may be a hard disk, a CD-ROM, a DVD RW, or a server connected to the network 160.

Figure 1B:
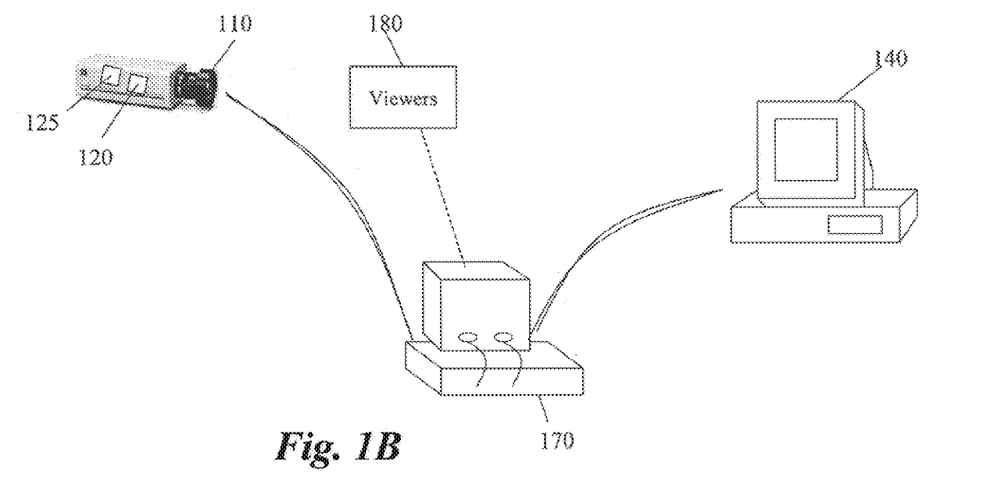
FIG. 1B illustrates how the emotion detection system monitors viewers' feedback.

FIG. 1B illustrates how the emotion detection system monitors viewers' feedback. Referring to FIG. 1B, viewers 180 watch a video sequence using, for example, a digital video player 170 playing on a television set. The video camera 130 is connected to the digital video player 170 and the computer 140. The video camera 130 monitors the viewers' behavior and emotion feedback during the video sequence play back. The computer 140 detects and categorizes viewers' behavior and emotion feedback, and indexes the video sequence using various categories of behavior and emotion segments as video indices.

For example, the emotion detection system 100 combines facial expression of the viewers, such as a smile, and audio signal in the viewers' voice, such as a laughter, to categorize the video segment as, for example, "funny". The "funny" segment may then be used to index the video sequence. As another example, if one of the viewers 180 is snoring, that section of the video sequence can be categorized and indexed as, for example, "non-interesting". On the other hand, if one of the viewers 180 is shouting, that section of the video sequence can be categorized and indexed as, for example, "interesting". Physical movement may be detected and used as video indices as well. For example, if some viewers 180 are leaving the room, or not looking at the display, these behavior may show lack of interest by the viewers, and may be so noted in the video indexing. Detecting viewers 180 leaving a room may use face detection algorithms. On the other hand, if more people show up in the room, that section of the video sequence may be categorized and indexed as "interesting", especially when people start laughing or commenting on the scene.

A certain emotion may belong to multiple categories in the emotion detection system 100. For example, a particular segment may be "happy" and "interesting", so that video indexing using either "happy" or "interesting" emotions may contain the same segment. Thereafter, one of the viewers 180 or another user can easily browse through specific categories of behavior and emotion segments within a stored video sequence by jumping to the particular segments directly. For example, a user may watch only "happy" moments within a video sequence.

In addition, different video indices may be generated by different users accordingly to the users' preference. For example, one user may watch "funny" segments of a video sequence, whereas another user may watch "astonished" segments of the same video sequence.

Figure 2:
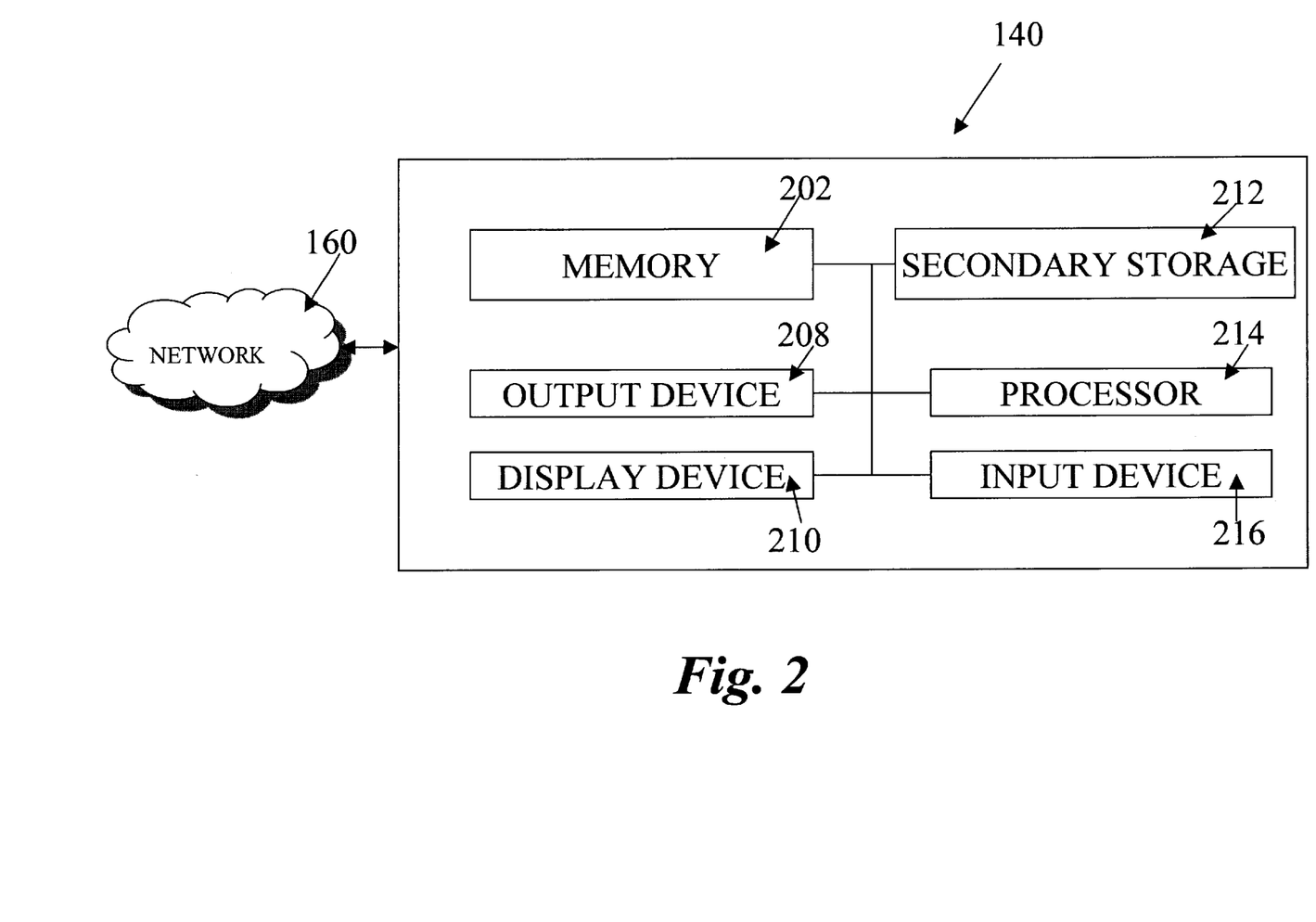
FIG. 2 illustrates an exemplary hardware components of a computer that may be used to in connection with the exemplary method for video indexing based on viewers' behavior and emotion feedback.

FIG. 2 illustrates exemplary hardware components of a computer 140 that may be used to in connection with the exemplary method for video indexing based on viewers' behavior and emotion feedback. The computer 140 has a connection with a network 160, such as the Internet or other type of computer or telephone networks, for sending recorded multimedia sequence and video indices to friends and family by, for example, email. The computer 140 typically includes a memory 202, a secondary storage device 212, a processor 214, an input device 216, a display device 210, and an output device 208.

The memory 202 may include random access memory (RAM) or similar types of memory. The secondary storage device 212 may include a hard disk drive, floppy disk drive, CD-ROM drive, DVD RW, or other types of non-volatile data storage. The secondary storage device 212 may correspond with various databases or other resources. The processor 214 may execute applications or other information stored in the memory 202, the secondary storage 212, or received from the Internet or other network 160. The input device 216 may include any device for entering data into the computer 140, such as a keyboard, key pad, cursor-control device, touch-screen (possibly with a stylus), or microphone. The display device 210 may include any type of device for presenting visual image, such as, for example, a computer monitor, flat-screen display, or display panel. The output device 208 may include any type of device for presenting data in hard copy format, such as a printer, and other types of output devices including speakers or any device for providing data in audio form. The computer 140 can possibly include multiple input devices, output devices, and display devices.

Although the computer 140 is depicted with various components, one skilled in the art will appreciate that this computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, CD-ROM, or DVD RW; a carrier wave from the Internet or other network; or other forms of RAM or ROM. The computer-readable media may include instructions for controlling the computer 140 to perform a particular method.

Figure 3:
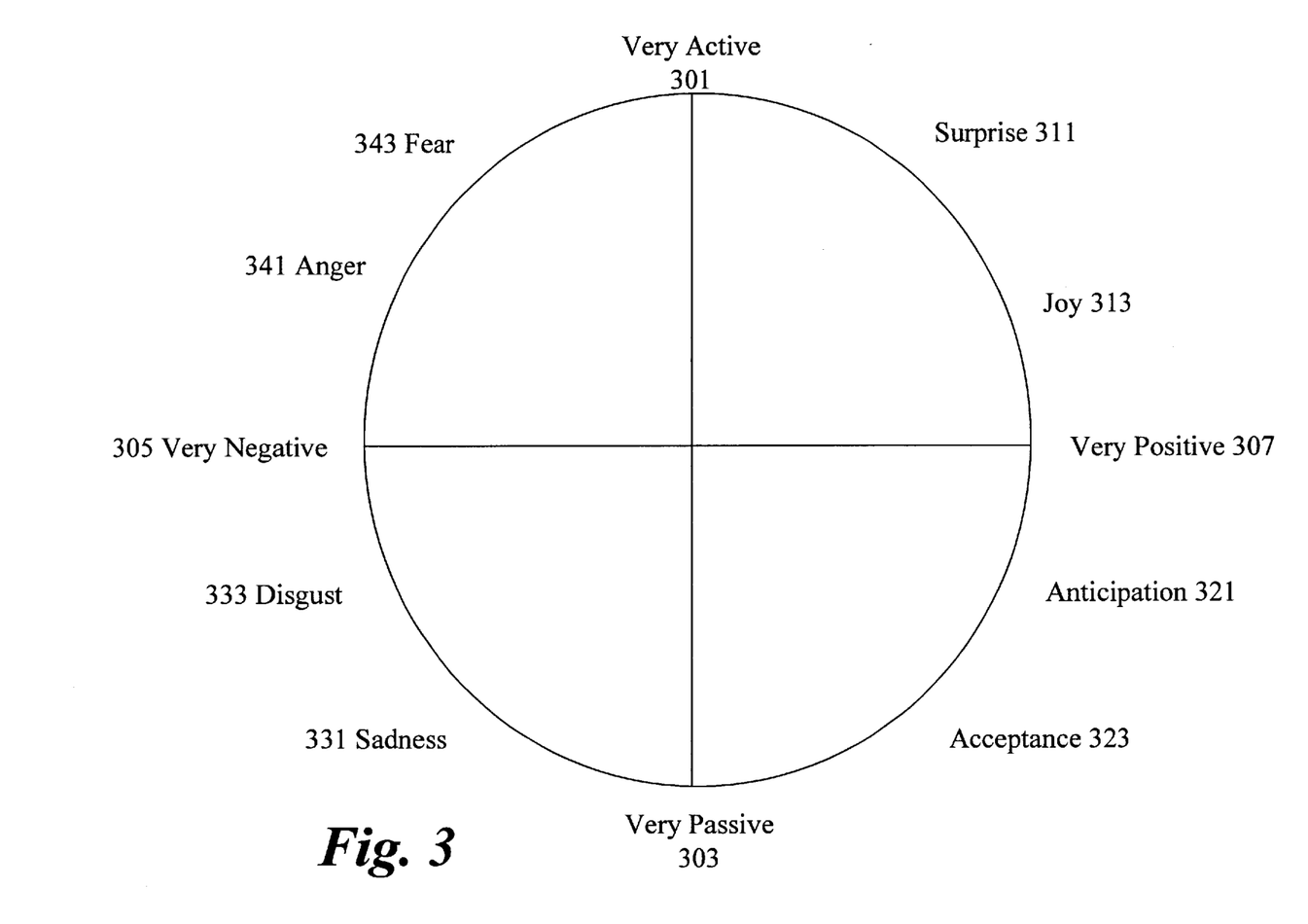
FIG. 3 illustrates an exemplary chart of behavior and emotion feedback.

FIG. 3 illustrates an exemplary chart of behavior and emotion feedback. A viewer's feedback may be very active 301 or very passive 303, very positive 307 or very negative 305. In between, various of behavior and emotion feedback are possible, for example, surprise 311, joy 313, anticipation 321, acceptance 323, sadness 331, disgust 333, anger 341, and fear 343. For more detailed description, see "Emotion Recognition in Human-Computer interaction" by Cowie et al, January 2001 on IEEE Signal Processing Magazine.

After the indexed multimedia sequence are processed and stored, the indexed multimedia sequence may be downloaded to the same or another computer 140 either by transmitting over wireless channels, through a network connection, or through a wired connection, such as universal serial bus (USB) or Firewire (IEEE 1394). Alternatively, the computer 140 may read the local storage of the video camera 130 by directly connecting to a reader of the computer 140. Thereafter, the indexed multimedia sequence may be played back on any video display device, such as a computer 140. The video display device may display the video indices as labeled icons for easy indexing, for example, "happy #1", "funny #2", or "interesting #5". A particular video index, for example, "happy #1", may be played back by clicking on an associated icon as displayed on the display device 210.

As a result, the user may browse through the multimedia sequence using the various categories of behavior and emotion segments as video indices. For example, when viewing the recorded multimedia sequence using the computer 140, a user may double click on one of the icons, for example, "funny", and start viewing all "funny" segments within the multimedia sequence.

The indexed multimedia sequence may also be saved on a server connected to the network 160, to be retrieved by other users. Alternatively, the indexed multimedia sequence may be transmitted to other users through the network 160 by, for example, e-mail. A friend or a family member who receives the multimedia sequence and the video indices may then easily browse through particular behavior and emotion segments of the multimedia sequence.

Figure 4A:
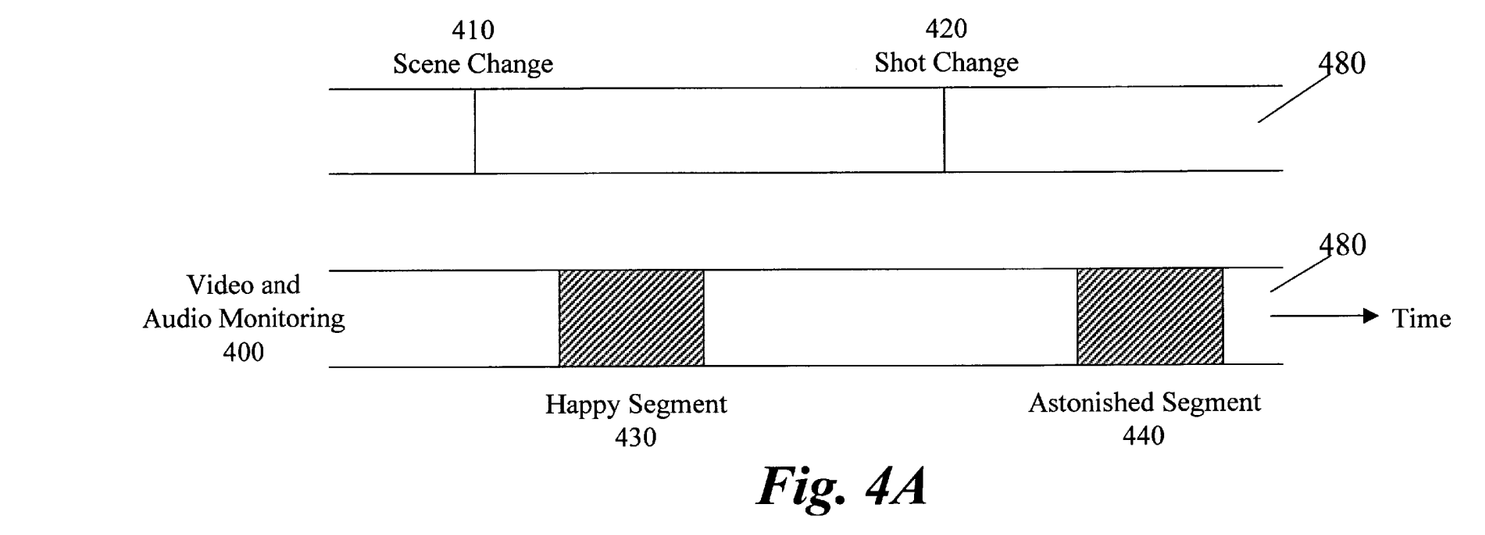
FIGS. 4–6 illustrate examples for video indexing based on viewers' behavior and emotion feedback.
Figure 5A:
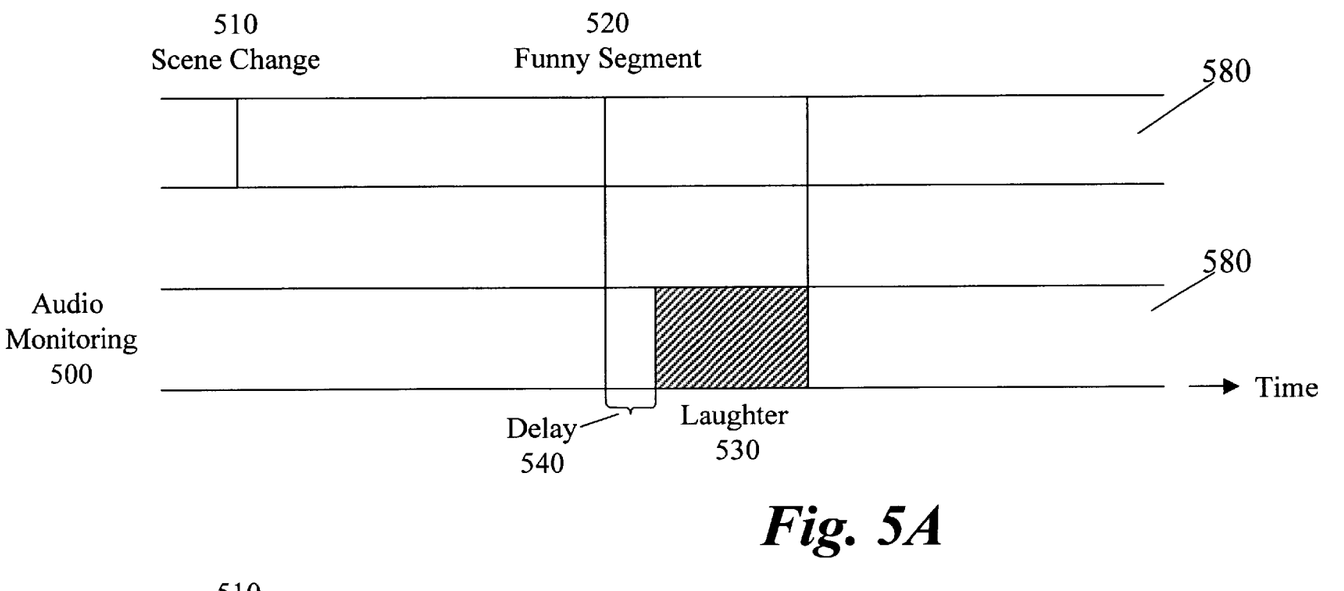
Figure 5B:
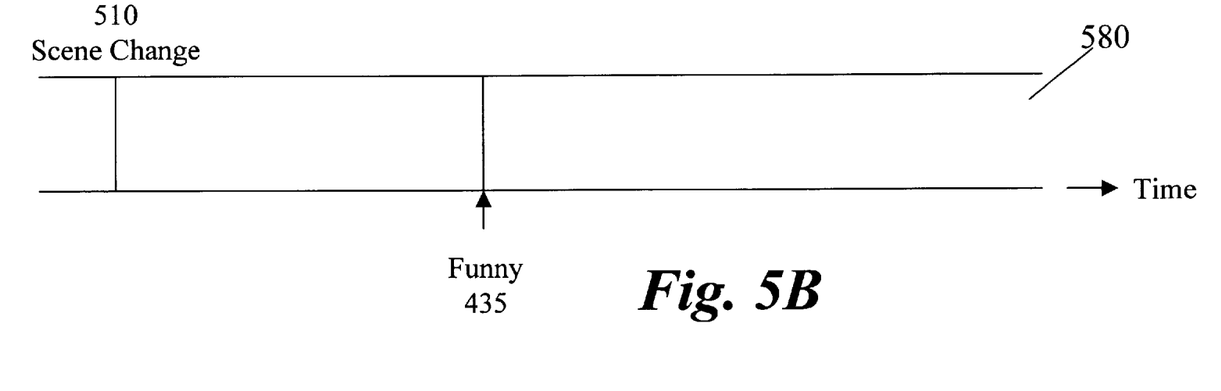
Figure 6A:
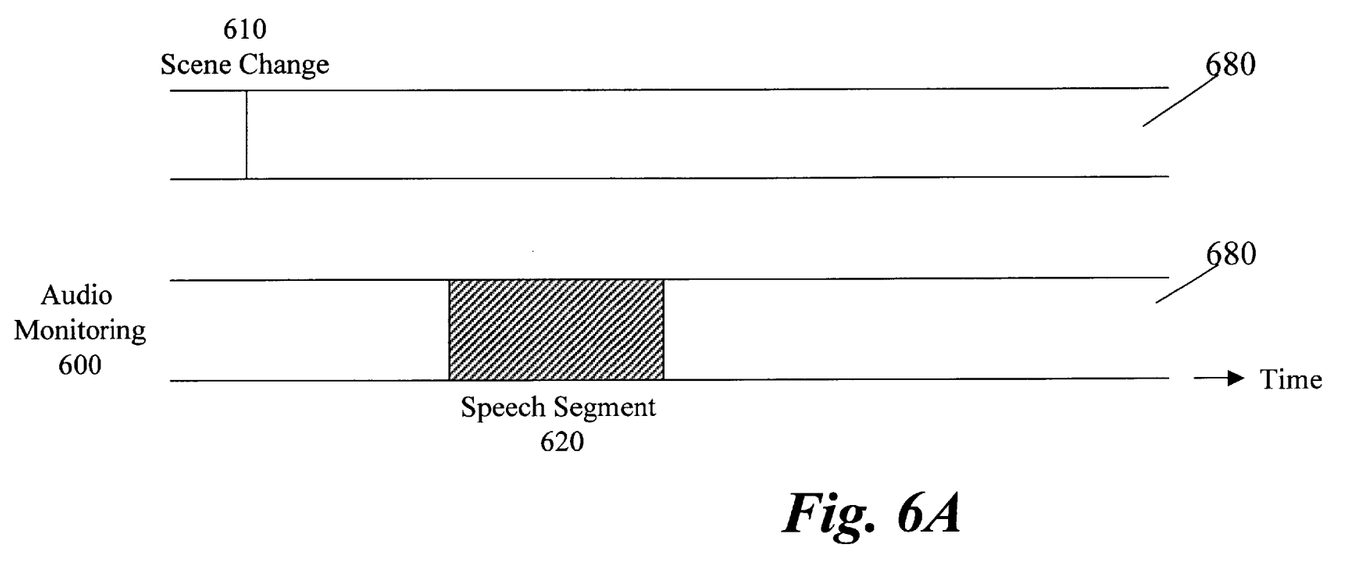

FIGS. 4–6 illustrate examples for video indexing based on viewers' behavior and emotion feedback. Referring to FIG. 4A, in addition to scene change 410 and shot change 420 monitoring, video and audio monitoring 400 may be conducted by the video camera 130 to detect the viewers' casual feedback. The emotion detection system 100 then categorizes various categories of behavior and emotion segments within a video sequence 480, such as a "happy" segment 430 and an "astonished" segment 440. For example, when a kid is crawling on the floor, a parent may be smiling. The emotion detection system 100 detects the emotion and automatically categorizes the segment of the video sequence as "happy" 430. Similarly, if somebody jumps down a trampoline in a swimming pool, the viewer may have an astonished expression. The emotion detection system 100 detects and categorizes that segment as "astonished" 440.

Figure 4B:
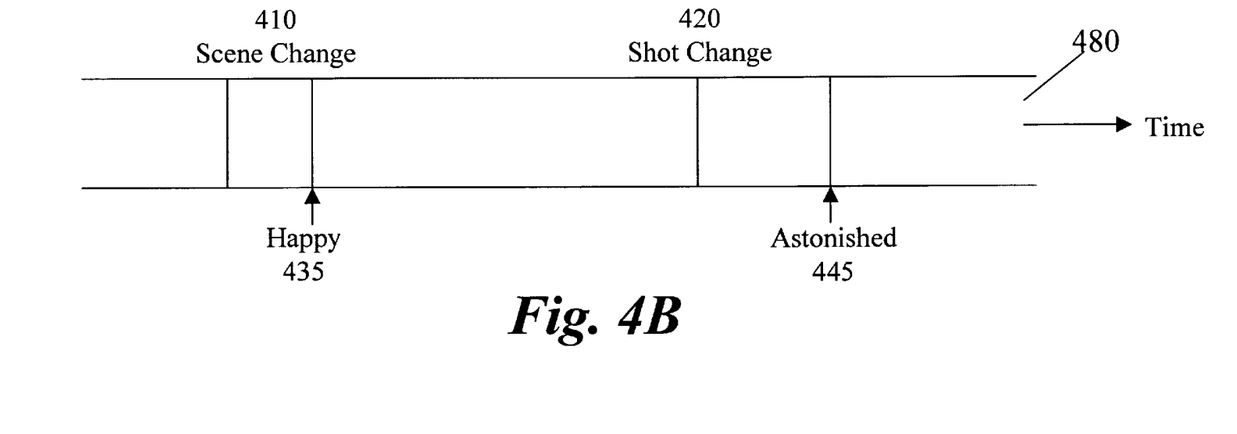

Referring to FIG. 4B, the computer 140 of the emotion detection system 100 indexes the video sequence 480 using the "happy" segment 430 and the "astonished" segment 440 as video indices 435, 445, respectively. Thereafter, the viewer or another user may selectively view the video sequence using the video indices 435, 445. For example, the user can browse through "happy" and "astonished" scenes by selecting "happy" 435 and "astonished" 445, respectively, on any video display device. Similarly, scene change 410 and shot change 420 may also be used as video indices. In addition, the video indices of behavior and emotion feedback may be labeled, for example, as "happy #1", "funny #2", or "interesting #4", within the video sequence for easy indexing.

In one embodiment, the emotion detection system 100 includes only audio sensors, such as microphones 120, so that only audio signals are detected for video indexing. Audio feedback is part of emotion feedback. For example, "laughter" is part of "happy", "amused" or "funny" emotion. In a video and audio bitstream, three channels are typically used, such as video, left audio, and right audio channels. The method and apparatus for indexing based on viewers' behavior and emotion feedback typically include at least an extra channel for audio feedback indexing to generate a hierarchical indexing structure. Two types of audio signals are generated, one representing system signal in the video sequence, the other representing the viewer's audio feedback. Thereafter, algorithms may be used to remove the viewer's audio signal from the system signal in the video sequence. A more sophisticated system may have a microphone for every viewer.

During a multimedia sequence, such as a video sequence, play back, the microphone 120 monitors audio signals. Any audio reaction of the viewers 180 may be indexed into the hierarchical index representation as a feedback input. Different techniques may be used to index the video sequence using audio signals.

FIGS. 5A and 5B illustrate an exemplary embodiment of audio feedback indexing. In this embodiment, the emotion detection system 100 detects basic oral characteristics, such as exclamations, laughter or speech, and indexes the oral characteristics into the video bitstream. Similar to the example illustrated in FIGS. 4A and 4B, in addition to scene change 510 monitoring, video and audio monitoring 500 may be conducted by the video camera 130 to detect viewers' audio feedback. The emotion detection system 100 then categorizes various categories of audio feedback within a video sequence 580, such as a "laughter" segment 530. The "laughter" segment 530 typically follows the beginning of a "funny" segment 520 after a brief delay 540.

Referring to FIG. 5B, the computer 140 of the emotion detection system 100 indexes the video sequence 580 using the "funny" segment 520 as a video index 525. Similarly, scene change 510 may also be used as a video index.

Thereafter, the viewer or another user may selectively view the video sequence using either one of the video indices 510 and 525.

FIG. 6 illustrates another exemplary embodiment of audio feedback indexing. In this embodiment, the emotion feedback system 100 tries to recognize the speech or other oral characteristics, and add relevant comments as annotations. In addition to scene change 610 monitoring, video and audio monitoring 600 is conducted by the video camera 130 to detect viewers' audio feedback. The emotion detection system 100 then categorizes various categories of audio feedback within a video sequence 680, such as a "speech" segment 620.

Figure 6B:
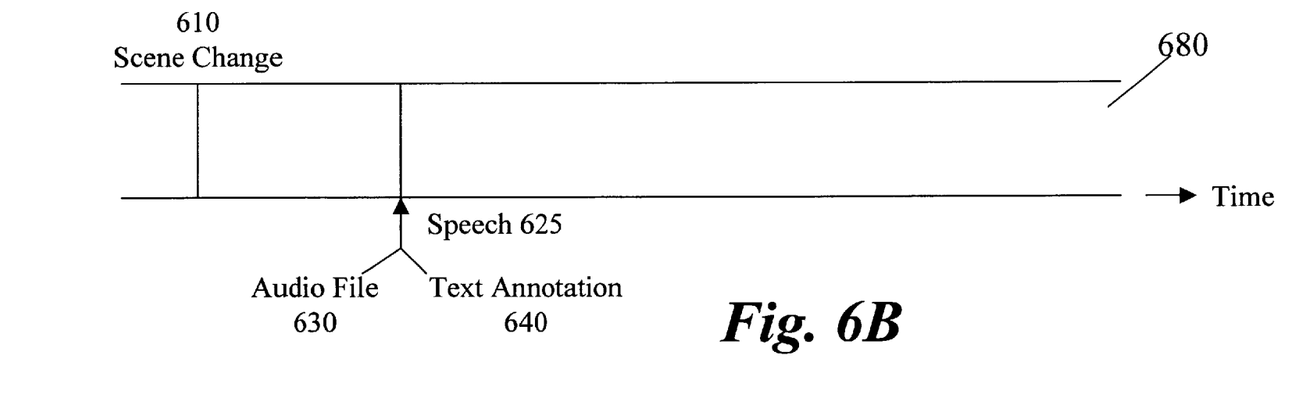

Referring to FIG. 6B, the computer 140 of the emotion detection system 100 indexes the video sequence 680 using the "speech" segment 620 as a video index 625. Similarly, scene change 610 may also be used as a video index. Thereafter, the viewer or another user may selectively view the video sequence 680 using either one of the video indices 610 and 625. In addition to an audio file 630, the computer 140 may insert a text annotation 640, representing the speech itself.

Figure 7:
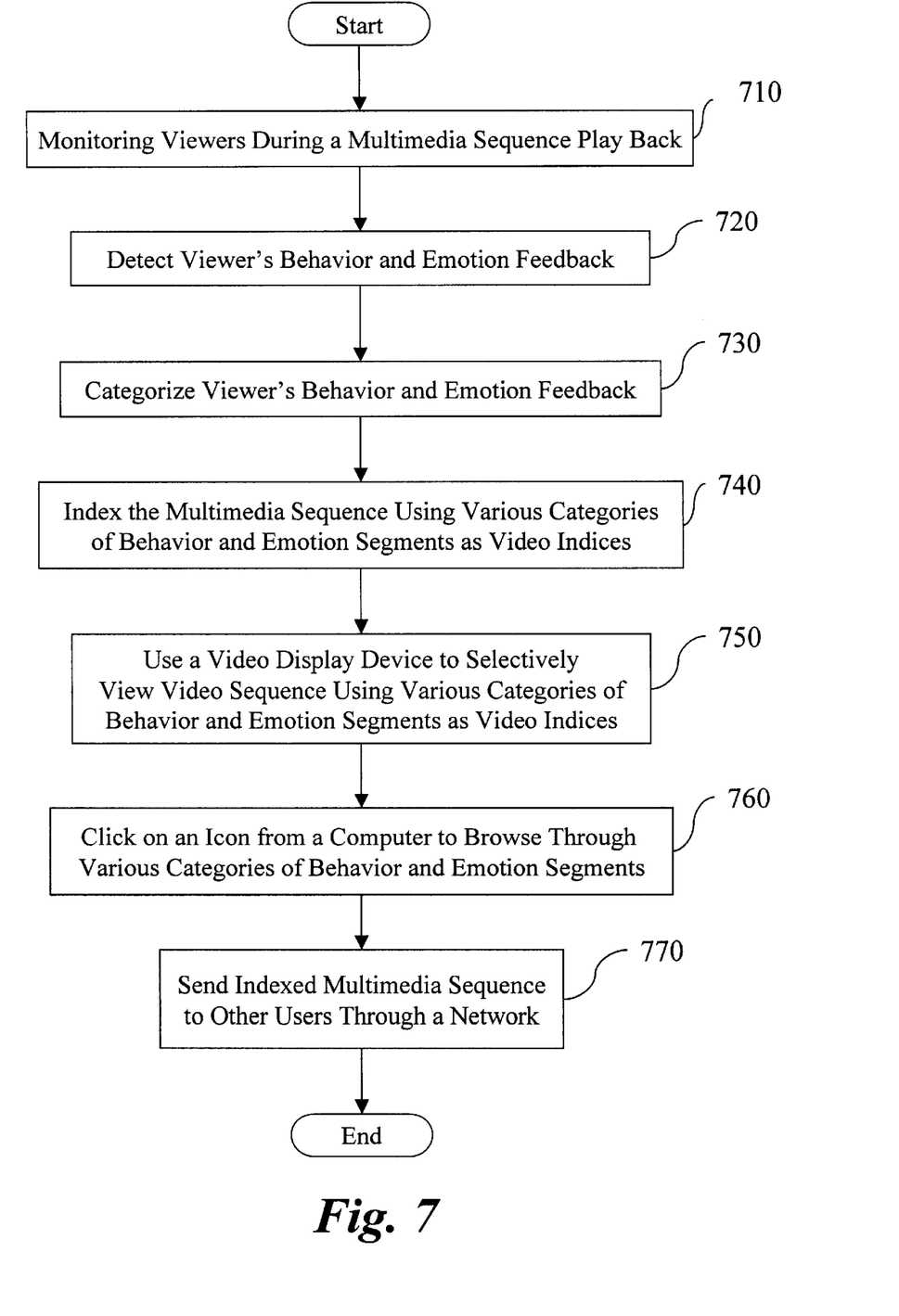
FIG. 7 is a flow chart illustrating a method for video indexing based on viewers' behavior and emotion feedback.

FIG. 7 is a flow chart illustrating the exemplary method for video indexing based on viewers' behavior and emotion feedback. The emotion detection system 100 may use a multimedia acquisition device 130, such as a video camera, to monitor one or more viewers 180 during a multimedia sequence, such as a video sequence, play back (block 710). The emotion detection system 100 then detect the viewers' behavior and emotion feedback (block 720). Next, the emotion detection system 100 may use a computer 140 to categorize the viewers' behavior and emotion feedback as various categories of behavior and emotion segments (block 730), and index the multimedia sequence using the various categories of behavior and emotion segments (block 740). Thereafter, the viewers 180 or another user may use any video display device, such as a computer 140, to selectively view the multimedia sequence using the various categories of behavior and emotion segments as video indices (block 750). The user may click on an icon from the video display device to browse through various categories of behavior and emotion segments (block 760). In addition, the indexed multimedia sequence may be sent to other users through a network 160 so that friends and family members may selectively view the multimedia sequence using the various categories of behavior and emotion segments as video indices (block 770).

While the method and apparatus for video indexing based on viewers' behavior and emotion feedback have been described in connection with an exemplary embodiment, those skilled in the art will understand that many modifications in light of these teachings are possible, and this application is intended to cover any variations thereof.

What is claimed is:

1. A method for video indexing based on viewers' behavior and emotion feedback, comprising:
   monitoring one or more viewers during a multimedia sequence play back;
   detecting the one or more viewers' behavior and emotion feedback;
   categorizing the one or more viewers' behavior and emotion feedback as a plurality of categories of behavior and emotion segments; and
   indexing the multimedia sequence using the plurality of categories of behavior and emotion segments,
   wherein a user can selectively view the multimedia sequence using the plurality of categories of behavior and emotion segments as video indices.

2. The method of claim 1, wherein the detecting step includes detecting facial expression of the one or more viewers.

3. The method of claim 1, wherein the detecting step includes detecting physical movement of the one or more viewers.

4. The method of claim 1, wherein the detecting step includes detecting audio signal in the one or more viewers' voice.

5. The method of claim 4, further comprising inserting text annotations corresponding to the audio signal.

6. The method of claim 1, wherein the categorizing step includes categorizing the one or more viewers' behavior and emotion feedback as one or more of "amused", "angry", "astonished", "curious", "patient", "happy", "proud", "scared", "worried", and other emotion feedback.

7. The method of claim 1, wherein the indexing step includes scene change and shot change indexing.

8. The method of claim 1, wherein the indexing step includes manual indexing using high resolution still images.

9. The method of claim 1, further comprising sending the multimedia sequence and the plurality of categories of behavior and emotion segments to other users through a network, whereby the other users can selectively view the multimedia sequence using the plurality of categories of behavior and emotion segments as the video indices.

10. The method of claim 1, further comprising using a video display device to selectively view the multimedia sequence using the plurality of categories of behavior and emotion segments as the video indices.

11. The method of claim 10, further comprising enabling the user to click on an icon from the video display device to browse through the multimedia sequence using the plurality of categories of behavior and emotion segments as the video indices.

12. An apparatus for video indexing based on viewers' behavior and emotion feedback, comprising:
    one or more multimedia acquisition devices capable of monitoring one or more viewers during a multimedia sequence play back, wherein each multimedia acquisition device includes one or more sensors for detecting the one or more viewers' behavior and emotion feedback; and
    a computer capable of categorizing the one or more viewers' behavior and emotion feedback as a plurality of categories of behavior and emotion segments, and indexing the multimedia sequence using the plurality of categories of behavior and emotion segments,
    wherein a user can selectively view the multimedia sequence using the plurality of categories of behavior and emotion segments as video indices.

13. The apparatus of claim 12, wherein the one or more sensors include image sensors.

14. The apparatus of claim 12, wherein the one or more sensors include audio sensors.

15. The apparatus of claim 12, further comprising a network capable of sending the multimedia sequence and the plurality of categories of behavior and emotion segments to other users, whereby the other users can selectively view the multimedia sequence using the plurality of categories of behavior and emotion segments as the video indices.

16. The apparatus of claim 12, wherein the multimedia acquisition device is a video camera.

17. A computer readable medium providing instructions for video indexing based on viewers' behavior and emotion feedback, the instructions comprising:
    monitoring one or more viewers during a multimedia sequence play back;

detecting the one or more viewers' behavior and emotion feedback;

categorizing the one or more viewers' behavior and emotion feedback as a plurality of categories of behavior and emotion segments; and indexing the multimedia sequence using the plurality of categories of behavior and emotion segments, wherein a user can selectively view the multimedia sequence using the plurality of categories of behavior and emotion segments as video indices.

18. The computer readable medium of claim 17, wherein the instructions for detecting include instructions for detecting facial expression of the one or more viewers.

19. The computer readable medium of claim 17, wherein the instructions for detecting include instructions for detecting physical movement of the one or more viewers.

20. The computer readable medium of claim 17, wherein the instructions for detecting include instructions for detecting audio signal in the one or more viewers' voice.

* * * * *